J. P. CARMINE.
AUTOMATIC COUPLING.
APPLICATION FILED DEC. 27, 1909.

1,059,593.

Patented Apr. 22, 1913.

Witnesses:

Inventor
Joseph Patrick Carmine.
by Foster Freeman Watson & Coit
Attorneys.

UNITED STATES PATENT OFFICE.

JOSEPH PATRICK CARMINE, OF WESTPORT, NEW ZEALAND.

AUTOMATIC COUPLING.

1,059,593.         Specification of Letters Patent.         Patented Apr. 22, 1913.

Application filed December 27, 1909. Serial No. 535,157.

*To all whom it may concern:*

Be it known that I, JOSEPH PATRICK CARMINE, a citizen of the Dominion of New Zealand, and residing at Westport, in the Provincial District of Westland, in the Dominion of New Zealand, have invented certain new and useful Improvements in Improved Automatic Couplings, of which the following is a specification.

The invention relates to couplings employed between the vehicles of trains, and the object is to effect the coupling automatically and the uncoupling from the side of the vehicle in order to prevent accident to the workmen employed in shunting.

According hereto, I employ upon the end of one vehicle a metal box having an opening in front and provided with a horizontal bar adapted to slide vertically in guides, said bar being connected by a link with a system of levers operable from the side of the train whereby said bar may be raised or lowered as desired. Upon the end of the opposing vehicle is a hook or plurality of hooks which, when the two vehicles are bumped together, pass under and raise the bar so that when said bar again falls it will engage with the hooks and couple the vehicles. Each vehicle is provided with a pair of ordinary buffers fitted with compression springs which minimize shock when the vehicles meet to be coupled. Means are provided for locking the bar to prevent it from releasing the hooks accidentally.

Figure 1:
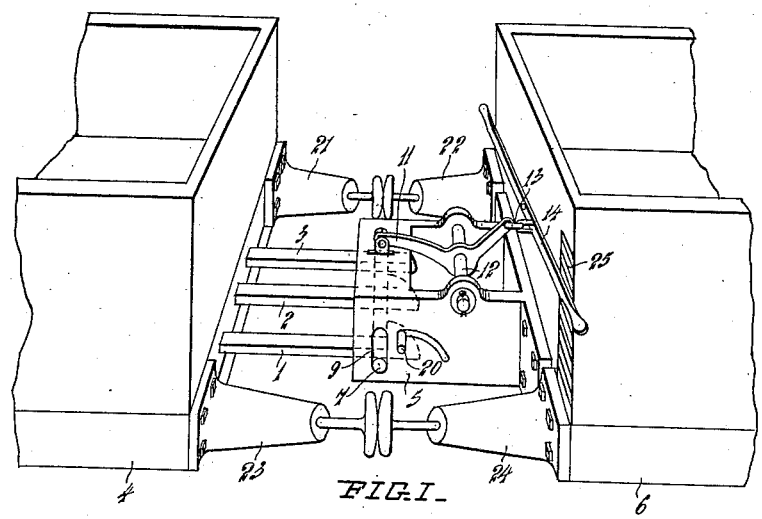
Figure 2:
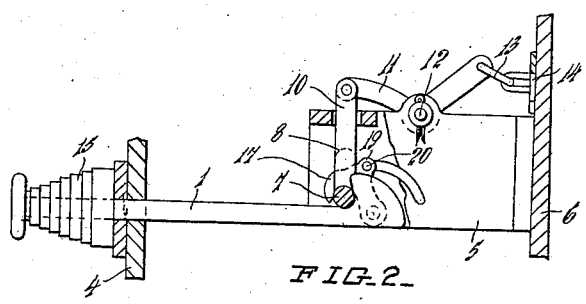
Figure 3:
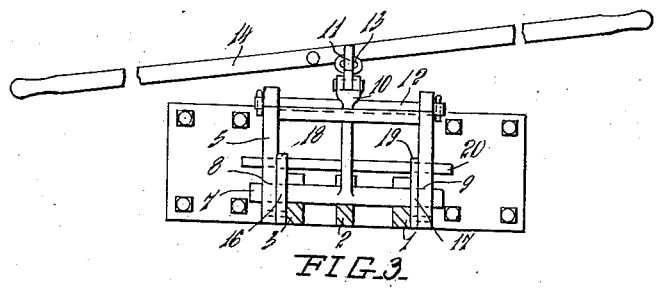

Referring to the accompanying drawings:—Figure 1 is a perspective view showing portions of two cars connected by a coupling embodying the present invention; Fig. 2 is a longitudinal vertical section through such coupling; Fig. 3 is a transverse sectional view showing one of the coupling members in end elevation.

The coupling hooks 1, 2 and 3 project from the end of the vehicle 4 and pass into a box 5 secured upon the end of the vehicle 6. Within the box 5 is a horizontal bar 7 working in guide slots 8 and 9 in the sides of the box and having an integrally formed vertical extension 10. The upper end of the extension 10 is pivotally connected to a bell crank lever 11 upon a rocking shaft 12 journaled in the box, and connected by a link 13 with a hand lever 14 which extends from side to side of the vehicle so as to be operable from either side thereof.

Each of the hooks 1, 2 and 3 is provided with a compression spring 15 as shown in Fig. 2 to minimize shock when the vehicles are drawn forward.

Retaining hooks 16 and 17 pivoted one on each side of the box 5 are adapted to pass over the bar and prevent it from becoming accidentally disengaged from the hooks. Ears 18 and 19 extending from the hooks 16 and 17 respectively are connected by a rod 20 which projects through slots upon each side of the box so that it may be operated from either side of the vehicle to release the hooks from the bar.

Buffers 21, 22, 23 and 24 of the usual type are employed.

To keep the bar 7 raised clear of the coupling hooks when desired to prevent the vehicles from coupling, the end of the lever 14 is depressed and engaged in a notched bracket 25 secured to the vehicle.

What I do claim and desire to secure by Letters Patent of the United States is:—

In a car coupling, the combination with a hook-shaped member, a box-like member into which the first said member is adapted to extend, a bar extending transversely across the interior of the box-like member and adapted to be engaged by the hook-shaped member, and means for moving said bar from position where it can be engaged by the hook-shaped member, of a second bar extending across the box-like member and passing through slots in the side walls thereof, and a hook carried by said second bar and adapted to extend over the first said bar to lock the latter in engagement with the hook-shaped member.

In testimony whereof I have signed my name to this specification in the presence of two witnesses.

JOSEPH PATRICK CARMINE.

Witnesses:
  HENRIE H. RAYWARD,
  ANNIE DOROTHY McKENZIE.

---

Copies of this patent may be obtained for five cents each, by addressing the "Commissioner of Patents, Washington, D. C."